United States Patent Office 3,074,995
Patented Jan. 22, 1963

---

3,074,995
BETA-CYANO ALKYLBENZYL ALCOHOLS
John G. Abramo and Earl C. Chapin, Springfield, Mass., assignors to Monsanto Chemical Company, St. Louis, Mo., a corporation of Delaware
No Drawing. Filed Feb. 25, 1960, Ser. No. 10,856
3 Claims. (Cl. 260—465)

The present invention is directed to benzyl alcohols and more particularly, to beta-substituted alkylbenzyl alcohols. For convenience, these featured compounds are generally referred to as "alcohols." Actually this term is intended to cover monohydric, dihydric and trihydric alcohols.

Compounds which serve directly as starting materials in condensation-type polymerization reactions are continually being sought by practitioners in the field of polymer synthesis. Of prime interest too, are intermediate materials which can be converted to these starting materials.

Accordingly, it is a principal object of this invention to provide compounds which are intermediates capable of being converted into starting materials for use in condensation-type polymerization reactions.

Another object is to provide compounds which can serve directly as monomers in condensation-type polymerizations.

Another object is to provide methods by which to provide both of the preceding types of compounds.

Other objects of the invention will in part be obvious and will in part appear hereinafter.

These and other objects of the present invention are attained in the production of beta-substituted alkylbenzyl alcohols having the structure:

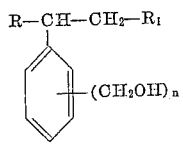

wherein R is selected from the class consisting of hydrogen and methyl radicals, $R_1$ is selected from the class consisting of cyano, carboxy and carboalkoxy radicals and $n$ represents an integer of 1–3.

The following examples are given in illustration of the present invention. Where parts are mentioned, parts by weight are intended unless otherwise described.

Example I

A solution of 50 grams of p-(beta-chloroethyl)benzyl alcohol in 200 ml. of ethyl alcohol is added to a solution of 17.5 grams of sodium cyanide in 200 ml. of water, contained in a 2-neck, 1-liter reaction vessel. After addition, the reaction is continued under stirring and heating at reflux temperature for six hours. At the end of this period, the reaction product is diluted with 500 ml. of water, causing a layer of organic material to separate from solution. The organic layer is separated by means of a separatory funnel, dried with magnesium sulfate and charged into a distillation apparatus fitted with a 10 inch Vigreaux column. Distillation at 0.3 mm. of Hg pressure yields 18 grams of liquid product boiling at 140–8° C. Analysis: calculated values for p-(beta-cyanoethyl)benzyl alcohol are C, 74.5; H, 6.84; N, 8.69; observed values for the liquid product are C, 72.9; H, 7.15; N, 7.37.

The phenylurethane of the preceding product is prepared by reacting the same with phenylisocyanate. Analysis: calculated values for $C_{17}H_{16}O_2N_2$: C, 72.8; H, 5.72; N, 10.0; observed values for the phenylisocyanate derivative: C, 72.09; H, 5.83; N, 9.92. This serves to substantiate the identity of the original product as p-(beta-cyanoethyl)benzyl alcohol.

Example II

The procedure set forth in Example I is again followed with the exception that 55 grams of p-(beta-chloroisopropyl)benzyl alcohol are used as a starting material. The product which results is p-(beta-cyanoisopropyl)benzyl alcohol.

Example III

Fifteen grams of p-(beta-cyanoethyl)benzyl alcohol is added to a solution of 5 grams of potassium hydroxide in 50 ml. of water. The mixture is maintained at reflux temperature and the evolution of ammonia is checked periodically at the reflux condenser using wet litmus paper. Evolution of ammonia ceases in about 4 hours and the reaction is considered complete. The resulting aqueous solution is then acidified with dilute hydrochloric acid until the solution indicates acid to litmus. The white solid which precipitates during acidification is collected by filtration and washed on a filter funnel using 100 ml. of ethyl ether. Crystallization of the white solid first with water and then with ethanol yields 8 grams of white crystal, melting at 150° C. Neutralization equivalent calculated for $C_{10}H_{12}O_3$ is 180 while the observed value for the crystalline product is 181, serving to identify the same as p-(beta-carboxyethyl)benzyl alcohol.

Example IV

A solution of 20 grams of concentrated sulfuric acid is slowly added with stirring to 200 ml. of 95% ethanol contained in a 500 ml. 3-neck flask provided with a stirrer, reflux condenser and dropping funnel. The flask is maintained in an ice bath throughout the addition of the sulfuric as well as during the addition of 16 grams of p-(beta-cyanoethyl)benzyl alcohol which follows. After both of the preceding additions are completed, the ice bath is removed and the reaction mixture is heated at reflux temperature for 2 hours. Thereafter, the reaction product is poured into 500 ml. of water and the organic layer which separates is collected by means of a separatory funnel. The aqueous portion is extracted twice with 100 ml. portions of ethyl ether which are combined with the organic layer. The ether solution is then washed twice with 100 ml. portions of 10% aqueous sodium bicarbonate and dried with sodium sulfate for 16 hours. The desiccant is then filtered off and the resulting ether solution is distilled at atmospheric pressure. Distillation is continued under a vacuum of 0.5 mm. of Hg. The product boiling at 155–163° C./0.5 mm. is subjected to infrared and elemental analysis identifying it as p-((beta-(ethoxycarbonyl)ethyl))benzyl alcohol.

The present invention is directed to producing beta-substituted alkylbenzene alcohols having the structure:

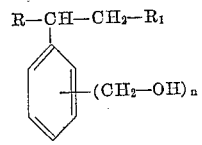

wherein R is selected from the class consisting of hydrogen and methyl radicals, $R_1$ is selected from the class consisting of cyano, carboxy and carboalkoxy radicals and $n$ represents an integer of 1–3.

The alcohols of the present invention can be considered as containing two types of primary substituents. The first of these is the functional alkyl substituent having the structure:

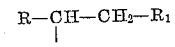

wherein R is selected from the class consisting of hydrogen and methyl radical and $R_1$ is selected from the class consisting of cyano, carboxy and carboalkoxy radicals. Accordingly, and more specifically when R represents hydrogen the functional alkyl substituent will be cyanoethyl, carboxyethyl or carboalkoxyethyl in nature and when R represents methyl this same substituent will be cyanoisopropyl, carboxyisopropyl or carboalkoxyisopropyl. The functional alkyl substituent is always limited to one in number on a given alcohol. The second type of primary substituent is the methyl alcohol substituent having the structure:

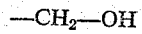

which can be 1–3 in number on a given alcohol as indicated earlier by subscript $n$ being equal to an integer of 1–3. As a result, the alcohols which can result can actually be monohydric, dihydric or trihydric in nature. The positions of the primary substituents on the phenyl radical can be varied, thus, in the case where $n$ represents an integer of 1 and the methyl alcohol substituents as a result are singular, the primary substituents can be positioned in the o-, m- or p-positions in relationship to one another. In addition to the primary substituents described above, other simple nuclear substituents, such as the halogens and alkyl radicals can be included on the phenyl radical.

The first group of compounds coming within the general class of beta-substituted alkylbenzyl alcohols are the alcohol-cyanides. The simplest of these, from a structural basis, include the o-, m- and p-(beta-cyanoethyl)benzyl alcohols. When R is a methyl radical these are the o-, m- and p-(beta-cyanoisopropyl)benzyl alcohols. The dihydric alcohol cyanide ($n=2$) which are intended are represented by the 2,4-bis-(hydroxymethyl)-1-(beta-cyanoethyl)benzenes and the 2,4-bis-(hydroxymethyl)-1-(beta-cyanoisopropyl)benzenes. While illustrative trihydric alcohol cyanide ($n=3$) are the 2,4,6-tris-(hydroxymethyl)-1-(beta-cyanomethyl)benzenes and the 2,4,6-tris-(hydroxymethyl)-1-(beta-cyanoisopropyl)benzenes.

The alcohol-cyanides can be produced by a process in which a corresponding beta-haloalkylbenzyl alcohol having the structure:

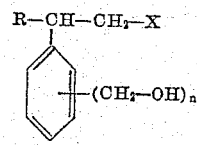

wherein R is selected from the class consisting of hydrogen and methyl radical, X is a halogen and $n$ represents an integer of 1–3, is reacted with about one (1) equivalent of an alkali metal cyanide in an alcoholic-aqueous medium at atmospheric reflux conditions. To illustrate: p-(beta-chloroethyl)benzyl alcohol is reacted with 1.10 equivalents of sodium cyanide in an ethanol-water solution (both the alcohol and cyanide starting materials being soluble in the said solution) at atmospheric reflex conditions to yield the corresponding p-(beta-cyanoethyl)benzyl alcohol. The beta-haloalkylbenzyl alcohols used as starting materials can be obtained in the manner set forth in our copending application Serial No. 790,052, filed January 30, 1959, since abandoned.

The second group of beta-substituted alkylbenzyl alcohols are the alcohol-acids. The simplest of these include the o-, m- and p-(beta-carboxyethyl)benzyl alcohols. When R represents a methyl group, these are the o-, m- and p-(beta-carboxyisopropyl)benzyl alcohols. Dihydric alcohol acids coming within this group are represented by the 2,4-bis-(hydroxymethyl)-1-(beta-carboxyethyl)benzenes and the 2,4-bis-(hydroxymethyl)-1-(beta-carboxyisopropyl)benzenes. Representative trihydric alcohol acids are illustrated by the 2,4,6-tris-(hydroxymethyl)-1-(beta-carboxyethyl)benzenes and the 2,4,6-tris-(hydroxymethyl)-1-(beta-carboxyisopropyl)benzenes.

The beta-substituted carboxyalkylbenzyl alcohols can be produced by what is in effect a two-step process. First, the corresponding beta-cyanoalkylbenzyl alcohol is reacted with approximately one equivalent of alkali metal hydroxide in an alcohol-water medium at atmospheric reflux conditions to produce the intermediate alkali metal salt of the desired acid. Acidification of this salt with inorganic mineral acid yields the desired beta-substituted carboxyalkylbenzyl alcohols. In illustration of the preceding p-(beta-cyanoethyl)benzyl alcohol is reacted with sodium hydroxide to give the sodium salt of p-(beta-carboxyethyl)benzyl alcohol. Acidification with sulfuric acid then yields the p-(beta-carboxyethyl)benzyl alcohol.

The third group of compounds included within the beta-substituted alkylbenzyl alcohols are the alcohol-alkyl esters. Initially, included within this group are those represented by the o-, m- and p-(beta-carbomethoxyethyl)benzyl alcohols, and when R represents a methyl group the o-, m- and p-(beta-carbomethoxyisopropyl)benzyl alcohols. The dihydric ($n=2$) alcohol alkyl esters within this group are illustrated by the 2,4-bis-(hydroxymethyl)-1-(beta-carbomethoxyethyl)benzenes and the 2,4-bis-(hydroxymethyl)-1-(beta-carbomethoxyisopropyl)benzenes. The trihydric alcohol alkyl esters ($n=3$) of this group are illustrated by the 2,4,6-tris-(hydroxymethyl)-1-(beta-carbomethoxyethyl)benzenes and the 2,4,6-tris-(hydroxymethyl)-1-(beta-carbomethoxyisopropyl)benzenes. Although the alkyl radical included within the carboalkoxy portion of the functional alkyl substituent on the beta-carboalkoxyalkylbenzyl alcohols can be extended in length through an indefinite number of carbons and can contain side groups, nevertheless, those containing a methyl or ethyl radical are preferred. The reasoning for this preference lies in the use for which the compounds are designed, that of acting as starting materials in trans-esterification reactions designed to produce condensation-type polymers. To illustrate: in a condensation-type reaction carried out between the carboxyalkoxy function of the subject alcohols and the hydroxyl function of another compound, efficiency is contributed to the reaction if the alcohol which is produced as an incidental product is one which has a comparatively low boiling point and as a result can be easily eliminated from the reaction medium. Methanol and ethanol have comparatively low boiling points and accordingly, reflect the preference indicated above.

The beta-carboalkoxyalkylbenzyl alcohols can be produced by a process in which a corresponding beta-cyanoalkylbenzyl alcohol is gradually added to an alkyl alcohol, the alkyl radical of the latter corresponding with that which is to terminate the functional alkyl substituent of the desired product, and the alcohol physically containing greater than about two (2) equivalents of mineral acid per mol of compound. Temperatures during the addition of the cyanide is kept at less than about 50° C. After addition is complete, the temperature is taken up to atmospheric reflux temperature and maintained there until the reaction reaches completion. To illustrate the preceding; p-(beta-cyanoethyl)benzyl alcohol is gradually added to a medium constituting 2 equivalents of sulfuric acid in ethanol. After the addition is complete the temperature is taken up to reflux and maintained as such until reaction is complete. The product obtained is p-(beta-carboethoxyethyl)benzyl alcohol.

Certain of the beta-substituted alkylbenzyl alcohols of the present invention can be used directly as monomeric components in condensation reactions designed to produce polymeric materials. The remainder can be converted to the same type monomeric components. The beta-carboxyalkylbenzyl alcohols can be condensed either by homocondensation because of the presence of both hydroxy and carboxy functions, or with other compounds containing hydroxy, carboxy or mixed functionality. The dihydric and trihydric alcohol variations of the beta-carboxyalkylbenzyl alcohols admit to even broader utilization or combination than do the monohydric alcohols.

The beta-carboalkoxyalkylbenzyl alcohols can perform similarly to the preceding compounds with the exception that the ester functions call for a trans-esterification-type reaction rather than straight esterification condensation-type reaction to which the beta-carboxyalkylbenzyl alcohols are subjected. The dihydric and trihydric alcohol forms of the beta-cyanoalkylbenzyl alcohols can be condensed directly with polybasic acids while the cyano function of the monohydric form can be converted to either the acid or ester function as shown previously and so altered can serve as starting materials in condensation-type reactions.

It will thus be seen that the objects set forth above, among those made apparent from the preceding description are efficiently attained and since certain changes may be made in carrying out the above products or processes without departing from the scope of the invention, it is intended that all material contained in the above description shall be interpreted as illustrative and not in a limiting sense.

What is claimed is:
1. Beta-cyano alkylbenzyl alcohols having the structure:

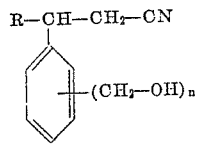

wherein R is selected from the class consisting of hydrogen and methyl radicals and $n$ is an integer of from 1 to 3.
2. p-(Beta-cyanoethyl)benzyl alcohol.
3. p-(Beta-cyanoisopropyl)benzyl alcohol.

References Cited in the file of this patent
UNITED STATES PATENTS
2,789,995    Johnston _____ Apr. 23, 1957
FOREIGN PATENTS
471,537    Canada _____ Feb. 11, 1951